(12) United States Patent
Plasier et al.

(10) Patent No.: US 8,196,662 B2
(45) Date of Patent: Jun. 12, 2012

(54) SURFACTANT BASED VISCOELASTIC FLUIDS AND METHODS OF USING THE SAME

(75) Inventors: Ronald Casey Plasier, Calgary (CA); Scott Robert Allen, Calgary (CA)

(73) Assignee: Baker Hughes Incorporated, Houston, TX (US)

( * ) Notice: Subject to any disclaimer, the term of this patent is extended or adjusted under 35 U.S.C. 154(b) by 354 days.

(21) Appl. No.: 12/620,442

(22) Filed: Nov. 17, 2009

(65) Prior Publication Data

US 2011/0114322 A1    May 19, 2011

(51) Int. Cl.
 *E21B 43/25* (2006.01)
 *E21B 43/26* (2006.01)
 *C09K 8/68* (2006.01)
 *C09K 8/72* (2006.01)

(52) U.S. Cl. .................. 166/307; 166/305.1; 166/308.2; 166/308.3; 166/308.6; 507/202; 507/240; 507/241; 507/244; 507/260; 507/267; 507/276; 507/277

(58) Field of Classification Search .................. None
See application file for complete search history.

(56) References Cited

U.S. PATENT DOCUMENTS

| | | |
|---|---|---|
| 4,534,875 A | 8/1985 | Rose |
| 4,615,825 A | 10/1986 | Teot et al. |
| 4,695,389 A | 9/1987 | Kubala |
| 4,770,814 A | 9/1988 | Rose et al. |
| 4,790,958 A | 12/1988 | Teot |
| 4,806,256 A | 2/1989 | Rose et al. |
| 4,880,565 A | 11/1989 | Rose et al. |
| H000751 H | 3/1990 | Sullivan et al. |
| 5,258,137 A | 11/1993 | Bonekamp et al. |
| 5,622,919 A | 4/1997 | Brezinski et al. |
| 5,697,443 A | 12/1997 | Brezinski et al. |
| 5,964,295 A | 10/1999 | Brown et al. |
| 5,979,555 A | 11/1999 | Gadberry et al. |
| 5,979,557 A | 11/1999 | Card et al. |
| 6,017,855 A | 1/2000 | Dawson et al. |
| 6,194,356 B1 | 2/2001 | Jones et al. |
| 6,232,274 B1 | 5/2001 | Hughes et al. |
| 6,306,800 B1 | 10/2001 | Samuel et al. |
| 6,399,546 B1 | 6/2002 | Chang et al. |
| 6,410,489 B1 | 6/2002 | Zhang et al. |
| 6,435,277 B1 | 8/2002 | Qu et al. |
| 6,468,945 B1 | 10/2002 | Zhang |
| 6,482,866 B1 | 11/2002 | Dahayanake et al. |
| 6,491,099 B1 | 12/2002 | Di Lullo Arias et al. |
| 6,605,570 B2 | 8/2003 | Miller et al. |
| 6,875,728 B2 | 4/2005 | Gupta et al. |
| 7,115,546 B2 | 10/2006 | Qu et al. |
| 7,303,018 B2 | 12/2007 | Cawiezel et al. |

(Continued)

FOREIGN PATENT DOCUMENTS

WO     0183946 A1   11/2001

(Continued)

*Primary Examiner* — George Suchfield
(74) *Attorney, Agent, or Firm* — John Wilson Jones; Jones & Smith, LLP

(57) ABSTRACT

Surfactant based viscoelastic fluids for enhancing the productivity of a hydrocarbon-bearing formations have particular applicability in acid fracturing of subterranean formations surrounding oil and gas wells. The viscoelastic fluid contains an organic acid, an inorganic monovalent salt and a quaternary ammonium aromatic salt and water. The fluid may further be foamed or energized.

20 Claims, 8 Drawing Sheets

U.S. PATENT DOCUMENTS

| | | |
|---|---|---|
| 7,345,012 B2 | 3/2008 | Chen et al. |
| 7,507,693 B2 | 3/2009 | Chen et al. |
| 7,527,102 B2 | 5/2009 | Crews et al. |
| 7,638,468 B2 * | 12/2009 | Gupta et al. .................. 507/240 |
| 2002/0039972 A1 | 4/2002 | Allan et al. |
| 2002/0132741 A1 | 9/2002 | Chang |
| 2003/0008781 A1 | 1/2003 | Gupta |
| 2003/0073585 A1 | 4/2003 | Di Lullo Arias et al. |
| 2004/0138071 A1 | 7/2004 | Gupta et al. |
| 2004/0152604 A1 | 8/2004 | Qu et al. |
| 2005/0028979 A1 | 2/2005 | Brannon et al. |
| 2006/0081370 A1 * | 4/2006 | Fu et al. ........................ 166/279 |
| 2006/0118302 A1 * | 6/2006 | Fuller et al. ................... 166/282 |
| 2006/0148660 A1 * | 7/2006 | Chen et al. .................... 507/261 |
| 2007/0235189 A1 * | 10/2007 | Milne et al. ................. 166/280.1 |
| 2008/0217012 A1 | 9/2008 | Delorey et al. |
| 2009/0107671 A1 * | 4/2009 | Waters et al. .............. 166/280.1 |

FOREIGN PATENT DOCUMENTS

| | | |
|---|---|---|
| WO | 0218745 A2 | 3/2002 |

* cited by examiner

SURFACTANT BASED VISCOELASTIC FLUIDS AND METHODS OF USING THE SAME

FIELD OF THE INVENTION

Viscoelastic fluids containing an organic acid are effective in enhancing the productivity of a hydrocarbon-bearing formation. The fluids have particular applicability in acid fracturing and matrix acidizing of subterranean formations.

BACKGROUND OF THE INVENTION

Subterranean formations penetrated by an oil or gas well are often treated by hydraulically fracturing the formations to increase the production of oil or gas. Fracturing of the formations is accomplished by pumping fluids into the borehole of the well under high pressure so that cracks or fissures are opened into the surrounding formation. Typically, the fracturing fluid is a liquid that is thickened by addition of a polymer or a surfactant. The fracturing fluid's viscosity is proportionally related to the created fracture geometry and fracture width so that more viscous fluids will produce longer and wider fractures.

In certain formations aqueous acid solutions, such as hydrochloric acid, are used to improve the permeability of the formation, thereby increasing production. Acid can be used in either fracturing or matrix acidizing applications. Techniques of acid fracturing and matrix acidizing are well known in the art.

One technique used in acid fracturing consists of the use of a fluid which contains a viscosifying polymer and, optionally, a crosslinking agent. For instance, acids may be viscosified with natural polymers like xanthan, synthetic polymers like polyacrylamides. In addition to slowing down the reaction rate of the acid, such viscosifying agents further assist in controlling leak-off and acid diversion. Xanthans and polyacrylamides are typically employed as viscosifying agents in linear (non-crosslinked) acid based fluids. Crosslinked fluids usually consist of either a guar or guar derivative or a synthetic polymer base gel crosslinked with an organometallic compound. Crosslinked and linear gelled fluids may be energized, foamed with nitrogen or emulsified with carbon dioxide.

The synthetic polymers that are typically used as viscosifying agents in the aqueous acid solutions of the prior art are stable at the high temperature conditions which are commonly found in deeper oil and gas wells. While such polymers are capable of reducing the reaction rate of the acid, they are often unacceptable since the higher viscosity of the spent acid and the residue from the polymer may cause a significant amount of damage to the formation. The increased viscosity is attributable to the spending of the acid. In addition, the increased viscosity of the fluid makes clean-up of the well more difficult.

Another acid fracturing technique utilizes alternating stages of foamed or emulsified fluids and non-foamed or non-emulsified fluids. Benefits of staged acid fracturing treatments include increased fracture length, enhanced acid diversion, and enhanced cooling of the formation and inhibition or retardation of the reaction rate of the acid with the formation. Otherwise, conventional aqueous acid fluids often react too quickly, depleting the acid with very little penetration of the formation.

In addition to acid fracturing, aqueous acid solutions are further often used in matrix acidizing. Matrix acidizing is often used in sandstone formations to remove near wellbore damage. In matrix acidizing, a fluid containing an acid or acid-forming material is injected into the formation below fracture pressure such that the acid or acid-forming material reacts with minerals in the formation in the near wellbore. Permeability of the formation is thereby increased. Formation damage caused by drilling mud invasion and clay migration may also be removed during the process. Matrix acidizing treatments are intended to result in radial penetration and axial distribution of the acid. The quick reaction of the acid with the formation in the near wellbore, however does not allow for deep penetration into the formation.

Since polymeric viscosifying agents may cause damage to the formation, greater emphasis has been placed lately on viscoelastic surfactant based fluids. Exemplary viscoelastic surfactant based fluids reported in the literature include those set forth in U.S. patent application Ser. No. 10/345,104, filed on Jan. 15, 2003, now U.S. Patent Publication No. 20040138071, published on Jul. 15, 2004, herein incorporated by reference. Such fluids minimize damage to the formation and further are effective at high temperature conditions. These fluids further contain, however, inorganic acids which are damaging in hydrocarbon-bearing formations consisting principally of coal.

Further, the viscoelastic fluids of the prior art often have failed to penetrate areas distal to the wellbore. When used in carbonate formations, injection of the viscoelastic fluid within the wellbore often causes dissolution of calcium carbonate which, in turn, causes formation of a channel through the matrix. As additional fluid is pumped into the formation, the fluid tends to flow along the channel, leaving the rest of the formation untreated. With the acidizing fluids of the prior art, typically, an additional means of diversion, either mechanical or chemical, is used to get better distribution of the acid. Chemical diverters can include foams or viscous gels, injected as stages in between the acid stages. While improved viscoelastic fluids, such as those described in U.S. Patent Publication No. 20040138071, show improvements in matrix acidizing, such fluids are typically not useful in coal and/or shale formations.

A need therefore exists for the development of viscoelastic fluids which minimize damage to the formation, generates sufficient viscosity for diversion or fracturing applications and which react slowly with the near wellbore regions as the fluid is introduced into the formation. A need particularly exists for the development of such fluids for use in acid fracturing and matrix acidizing and especially for use in coal.

SUMMARY OF THE INVENTION

The invention relates to surfactant based viscoelastic fluids containing an organic acid, an alkyl trialkyl quaternary ammonium aromatic salt and an inorganic monovalent salt in water used for enhancing the productivity of a hydrocarbon-bearing formation. The fluid may further be energized with nitrogen or carbon dioxide.

The viscoelastic fluid exhibits increased viscosity at high temperatures. In addition to their use in acid fracturing, the viscoelastic fluids are useful in matrix acidizing.

While they may be used to treat any type of well, the fluid has particular applicability in the treatment of low permeability subterranean formations, such as those comprised primarily of coal, limestone, dolomite, shale, siltstone, and diatomite. The fluid is particularly useful in the treatment of coal bed methane wells.

BRIEF DESCRIPTION OF THE DRAWINGS

In order to more fully understand the drawings referred to in the detailed description which follows, a brief description of each drawing is presented, in which.

DETAILED DESCRIPTION OF THE PREFERRED EMBODIMENTS

Figure 1:
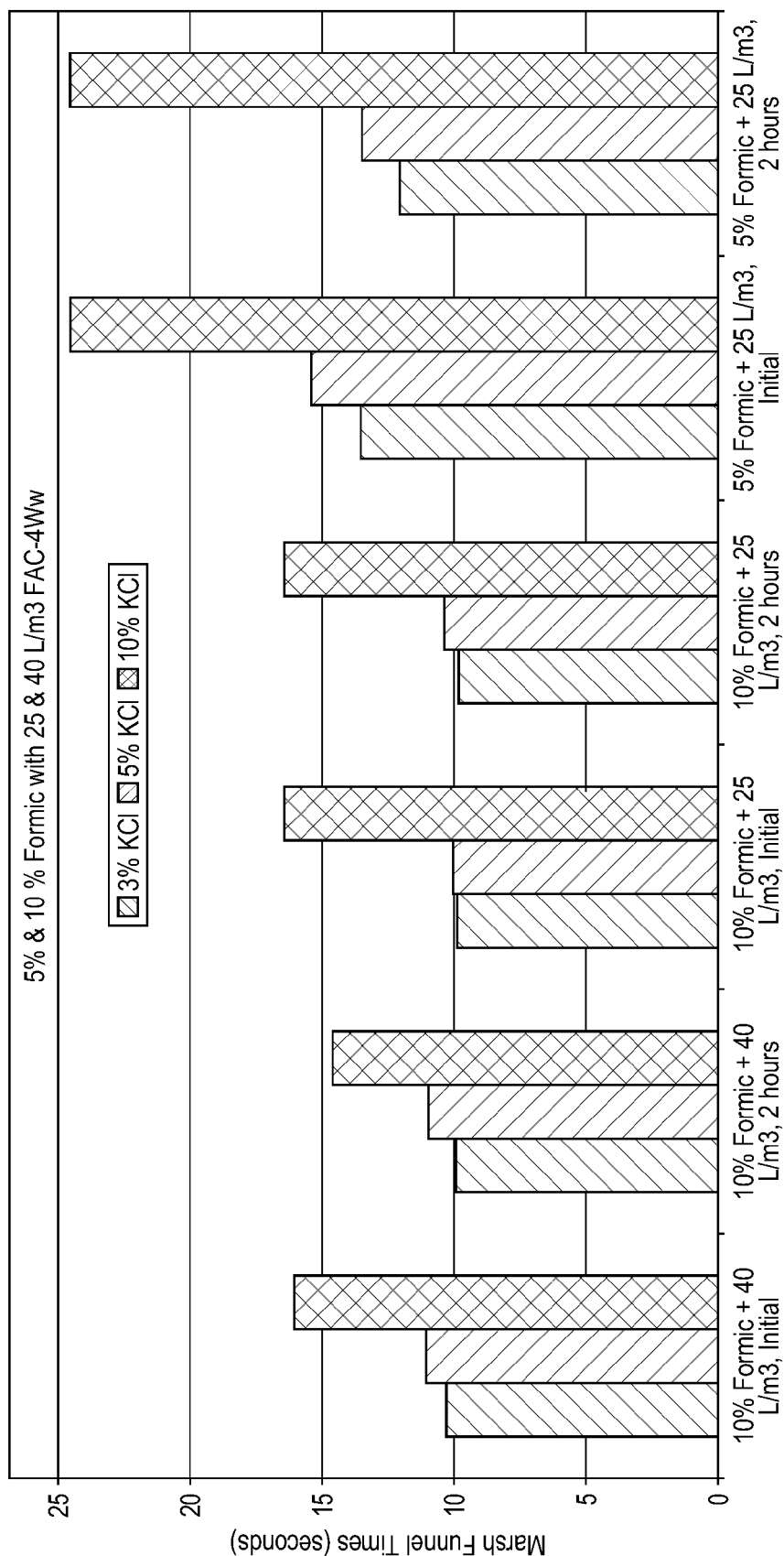
FIG. 1 shows the effect of increased concentration of surfactant and organic acid at various salt concentrations on the viscosity of the viscoelastic fluid described herein.

The surfactant based viscoelastic fluid described herein is useful in enhancing the production of hydrocarbon bearing formations. In a preferred embodiment, the viscoelastic material is used in acid fracturing, using organic acids, of subterranean formations penetrated by an oil, gas or geothermal well. In addition, the invention relates to the use of surfactant based organic acid gels in matrix acidizing techniques.

The viscoelastic fluid must contain at least four components in order to gel properly: an organic acid such as formic or acetic acid and mixtures thereof, a monovalent inorganic salt, an alkyl trialkyl quaternary ammonium aromatic salt and water. The inorganic salt is typically batch mixed with the organic acid. The alkyl trialkyl quaternary ammonium aromatic salt is preferably added "on the fly" to minimize gel formation. The gelled fluid may further be foamed or emulsified.

The gelled viscoelastic fluid has particular applicability in the stimulation of coal formations and can also be used in shale, carbonates and sandstone formations as well.

The quaternary ammonium aromatic salt of the viscoelastic fluid described herein is typically a $C_{10}$ to $C_{24}$ alkyl trialkyl quaternary ammonium aromatic salt. The alkyl group forming the alkylated moiety can be a $C_{10}$ to $C_{24}$ alkyl group, preferably a $C_{12}$ to a $C_{20}$ alkyl. In a most preferred embodiment, the alkyl group forming the alkylated moiety is a $C_{18}$ alkyl. The aromatic salt is preferably an aromatic salicylate or phthalate. The trialkyl moiety contains preferably from $C_1$ to $C_4$ alkyl groups, most preferably methyl. In a preferred mode, the surfactant is a $C_{18}$ trimethyl quaternary ammonium phthalate or a $C_{18}$ trimethyl quaternary ammonium salicylate. Typically, the weight percent of the $C_{10}$ to $C_{24}$ alkyl trialkyl quaternary ammonium aromatic salts in the viscoelastic fluid is between from about 0.1 to about 100 weight percent, preferably between from about 1 to about 4 weight percent.

Such $C_{10}$ to $C_{24}$ alkyl trialkyl quaternary ammonium aromatic salts may be formed by mixing a $C_{10}$ to $C_{24}$, preferably a $C_{18}$, alkyl trialkyl quaternary ammonium chloride with an alkali aromatic salt, such as a sodium salt of either salicylic acid or phthalic acid.

The fluid typically contains between from about 5 to about 10 wt % of the organic acid. In addition to the organic acid and quaternary ammonium aromatic salt, the viscoelastic fluid further contains an inorganic salt, preferably a monovalent salt, and water. The presence of the inorganic monovalent salt increases the ionic strength of the fluid and thereby allows gelation of the organic acid when the quaternary ammonium aromatic salt is added.

The amount of monovalent salt in the fluid is typically between from about 3 to about 10 wt %. Suitable monovalent salts include potassium chloride, ammonium chloride, sodium chloride and mixtures thereof. Calcium chloride and magnesium chloride are typically not preferred in order to limit the formation of calcium and magnesium salts of the organic acids. Salts (like calcium formate and magnesium formate) have limited solubility in water and precipitate when the organic acid spends with subterranean carbonate formations like limestone and dolomite.

If the iron content is low the gel of the invention does not need additional corrosion inhibitors for corrosion protection at less than 70° C. At higher temperatures, such as between 71° C. to 105° C., or if the ferric iron concentration is >5,000 ppm, a corrosion inhibitor package is often desired with the system to prevent corrosion of oil field tubulars. Any corrosion inhibitor package known in the art may be used. Preferred corrosion inhibitor packages include those containing propargyl alcohol with potassium iodide. Typically, the amount of corrosion inhibitor package in the viscoelastic fluid is between from about 0.2 to about 2.5 wt %.

The organic acid of the viscoelastic fluid has a slower reaction rate than inorganic acids, and spending of the organic acid results in the formation of a buffer which further reduces the reaction rate. Therefore, iron control in the viscoelastic fluids described herein is not usually required since less elemental iron is placed in solution when exposed to the formation than in a similar fluid containing an inorganic acid. The formation of the buffer during spending reduces the likelihood of forming iron precipitates.

The gel viscosity breaks when the acid spends, the gel comes into contact with hydrocarbon based formation fluids or if used with a breaker.

When treating a subterranean formation which is sensitive to water (such as dry coal beds), it is often necessary to minimize the amount of water in the well treatment fluid by energizing with either nitrogen or liquid carbon dioxide ($CO_2$), foaming with a gas, such as nitrogen or emulsifying the fluid with liquid $CO_2$. Typically, the word "energized" refers to a fluid containing two phases whereby less than 63 volume percent of the internal phase is either a gas or a liquid (e.g. nitrogen or liquid $CO_2$). Typically, the term "foamed" refers to a fluid that contains more than 63 volume percent of the internal phase is either a gas or a liquid. Suitable foamed fluids typically have a foam quality greater than or equal to 70%, preferably up to 95% when nitrogen is used and greater than or equal to 70%, preferably up to 85% when liquid $CO_2$ is used. Foaming a fluid increases the viscosity of the fracturing fluid and allows for a reduction in the amount of water without loss of treatment fluid volume. While nitrogen and liquid $CO_2$ are described as examples of a suitable gas or liquid that can be used for the internal phase of the foamed fluid it is to be appreciated that in accordance with the invention, any other gases or fluids known in the art may be utilized.

The viscoelastic fluid may further contain a proppant. Suitable proppants include those conventionally known in the art including quartz sand grains, glass beads, aluminum pellets, ceramics, plastic beads and ultra lightweight (ULW) particulates such as ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc. Further the proppant may include porous ceramics or organic polymeric particulates. The porous particulate material may be treated with a non-porous penetrating material, coating layer or glazing layer. For instance, the porous particulate material may be a treated particulate material, as defined in U.S. Patent Publication No. 20050028979 wherein (a) the ASG of the treated porous material is less than the ASG of the porous particulate material; (b) the permeability of the treated material is less than the permeability of the porous particulate material; or (c) the porosity of the treated material is less than the porosity of the porous particulate material.

When present, the amount of proppant in the well treatment fluid is typically between from about 0.5 to about 12.0, preferably between from about 1 to about 8.0, pounds of proppant per gallon of the viscoelastic fluid.

Conventional additives may further be used in the viscoelastic fluid described herein. However, in light of the cationic nature of the quaternary ammonium aromatic salt in the fluid which plates out on clays and silicates, no extra clay stabilization additive is typically required. The quaternary ammonium aromatic salt has the added benefit of being a good foamer therefore, additional foamers, foam stabilizers are emulsifiers are not typically required.

The viscoelastic fluids defined herein have particular applicability as fracturing fluids for fracturing subterranean formations, including those formations surrounding oil or gas wells. Since organic acids are less reactive than inorganic acids, the acid in the fluid of the invention spends slower for a given acid strength.

The fluids are particularly efficient when used in staged fracturing applications. For instance, staged fracturing may consist of alternating stages of a foamed or emulsified fluid and a non-foamed or non-emulsified fluid. Such staged fracturing principally serves to extend the fracture such that etching of the fracture faces occur further into the formation. In addition, staged fracturing improves diversion of the acid into the formation and inhibits or retards the reaction rate of the acid with the formation.

Further, the viscoelastic fluid of the invention has particular applicability in matrix acidizing. Techniques of acid fracturing and matrix acidizing are well known in the art. The viscoelastic fluid, at 20° C., typically exhibits a viscosity of from about 2 to about 30 cP @ 511 sec$^{-1}$ and is much higher if the treatment fluid is foamed.

While the viscoelastic fluids described herein may be used to treat any type of well that require stimulation including high pressure and low pressure wells, in a preferred embodiment, the fluid is used to treat low pressure wells. An example of low pressure wells suitable for using the viscoelastic fluid defined herein are those low pressure wells (of between about 1 to about 100 psi) such as coal bed methane wells. Such wells may or may not produce water. These types of wells are perforated in many coal seams with varying productivity in each zone.

In addition to coal, the viscoelastic fluids described herein find particular applicability in the treatment of subterranean formations such as those comprised primarily of limestone, dolomite, shale, siltstone, diatomite, etc.

The following examples will illustrate the practice of the present invention in its preferred embodiments. From the foregoing, it will be observed that numerous variations and modifications may be effected without departing from the true spirit and scope of the novel concepts of the invention. It is intended that the specification, together with the examples, be considered exemplary only, with the scope and spirit of the invention being indicated by the claims which follow.

EXAMPLES

Examples 1-12

The surfactant gellant FAC-4W was prepared by mixing about 15 kg of sodium salicylate in 200 L of $C_{18}$ trimethyl quaternary ammonium chloride at room temperature for five minutes. FAC-4Ww, a winterized version of FAC-4W, was prepared by adding to 60 vol. % of FAC-4W approximately 32 vol. % of isopropyl alcohol and 8 vol. % of water. FAC-4Ww exhibited a freezing point of about −10° C.

40 L/m$^3$ FAC-4Ww was then added to an aqueous solution containing 10 wt % formic acid and 10 wt % potassium chloride and then placed into a Fann 35 viscometer cup. The cup was then placed on a Fann 35 viscometer using a B1 bob and a 1/5$^{th}$ spring. Dial readings were recorded as the sample was subjected to a rate sweep of 100 and 300 rpm. The results are set forth in Table 1 wherein the "corrected 300 rpm" refers to 1/5 of the 300 rpm reading and represents the viscosity in cP at 511 sec$^{-1}$.

TABLE 1

| Ex. No. | KCl (kg/m$^3$) | Formic acid (%) | FAC-4Ww (L/m$^3$) | 300 rpm | Corrected 300 rpm |
|---|---|---|---|---|---|
| 1 | 0 | 0 | 0 | 6 | 1.2 |
| 2 | 0 | 10 | 40 | 9 | 1.8 |
| 4 | 20 | 10 | 40 | 12 | 2.4 |
| 5 | 40 | 10 | 40 | 31 | 6.2 |
| 6 | 50 | 10 | 40 | 44.5 | 8.9 |
| 7 | 60 | 10 | 40 | 55.5 | 11.1 |
| 8 | 70 | 10 | 40 | 71 | 14.2 |
| 9 | 70 | 5 | 25 | 80 | 16 |
| 10 | 80 | 10 | 40 | 89 | 17.8 |
| 11 | 90 | 10 | 40 | 126 | 25.2 |
| 12 | 100 | 10 | 40 | 160 | 32 |

Table 1 shows that the formic acid without the addition of inorganic salt has very little viscosity but that viscosity increases substantially as the amount of salt increases. It also shows that decreasing the formic acid strength from 10 wt % to 5 wt % can actually increase viscosity for a given salt concentration, even at lower surfactant concentrations.

Example 13

Figure 2:
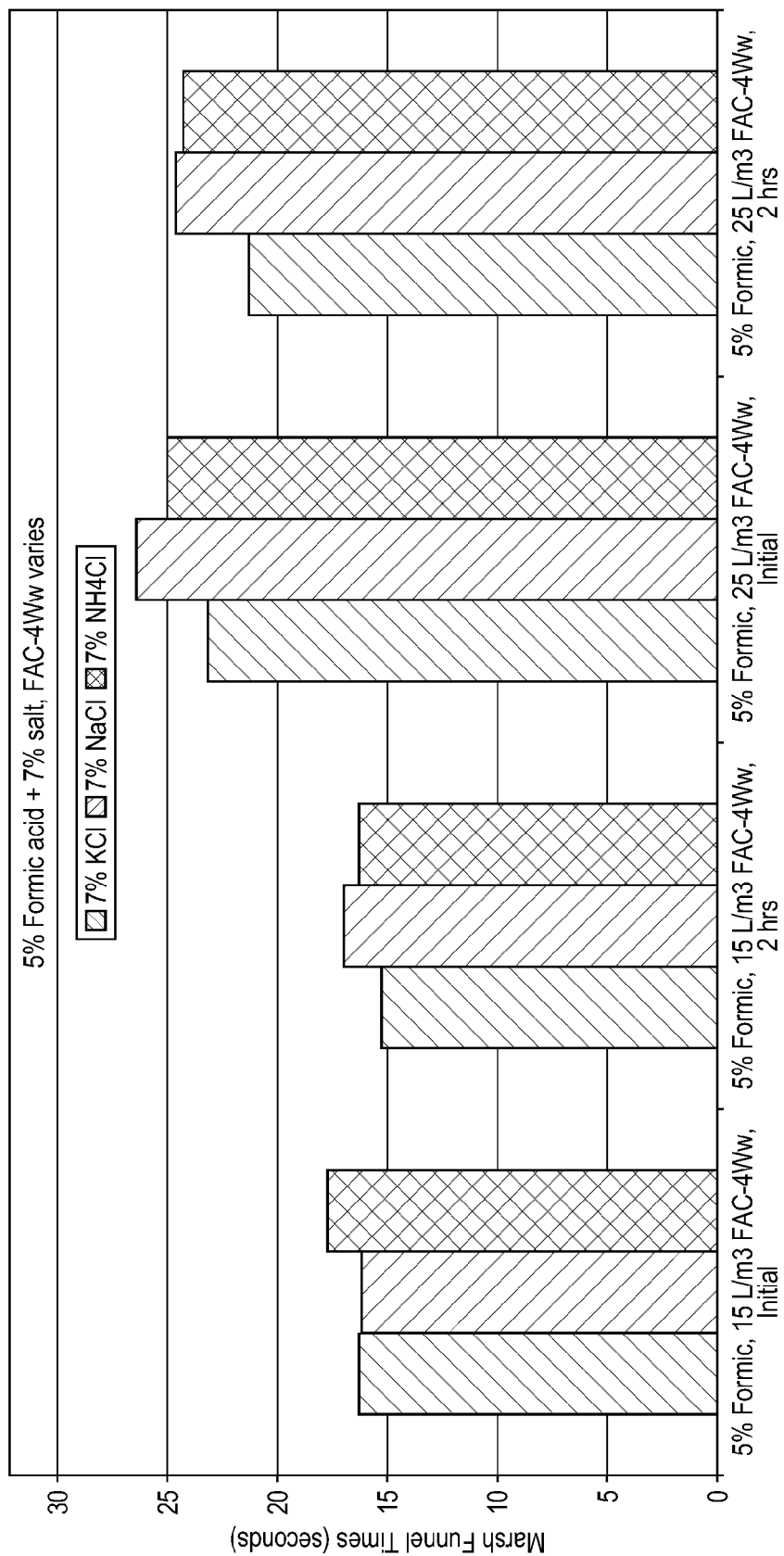
FIG. 2 shows the effect of increased concentration of surfactant on the viscosity of the viscoelastic fluid described herein which contains 5 wt % organic acid and 7 wt % monovalent salt.
Figure 3:
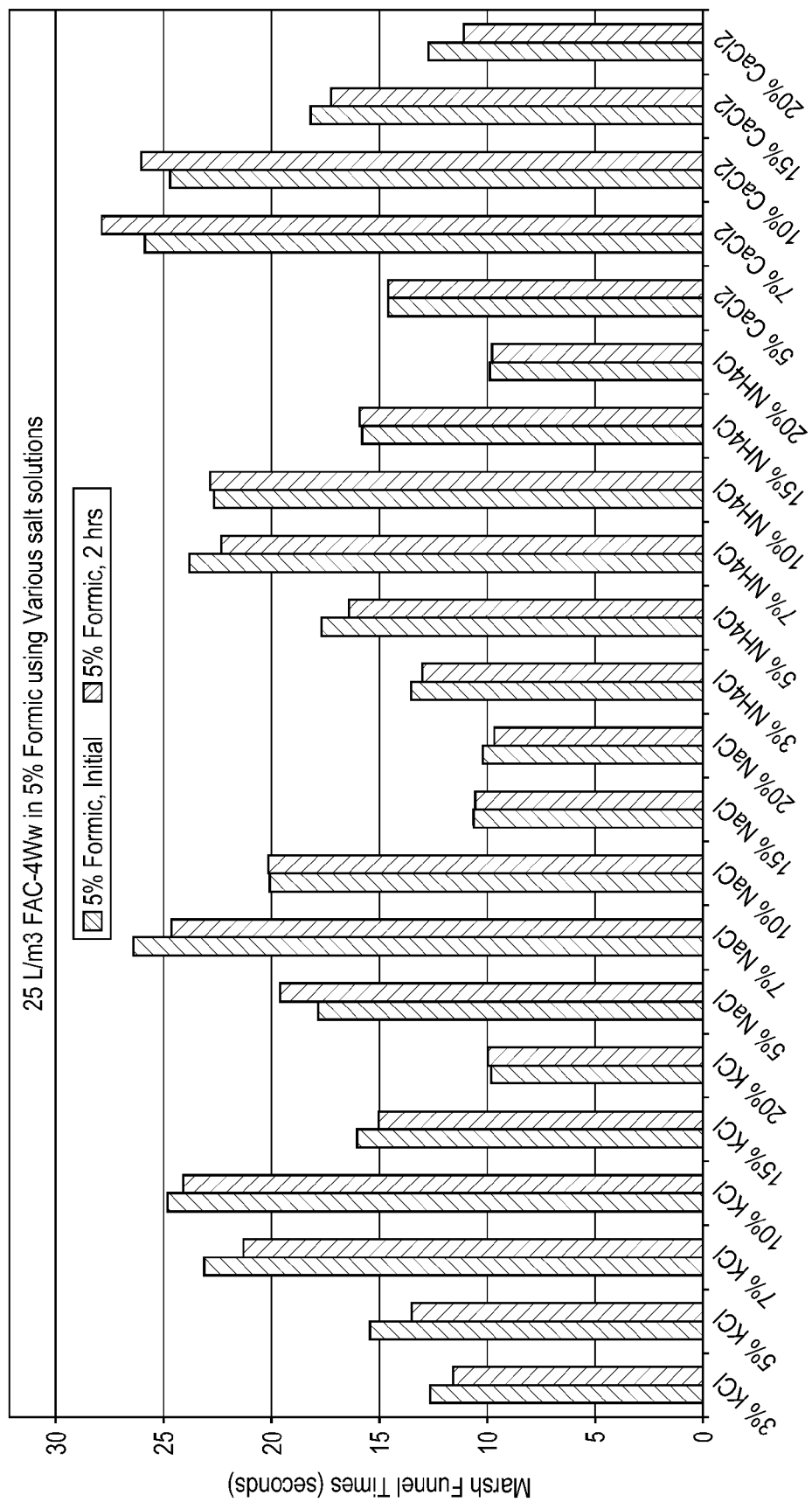
FIG. 3 shows the effect of various salts and salt concentrations on the viscosity of the viscoelastic fluid described herein which contains 5 wt % organic acid and 25 L/m$^3$ surfactant.
Figure 4:
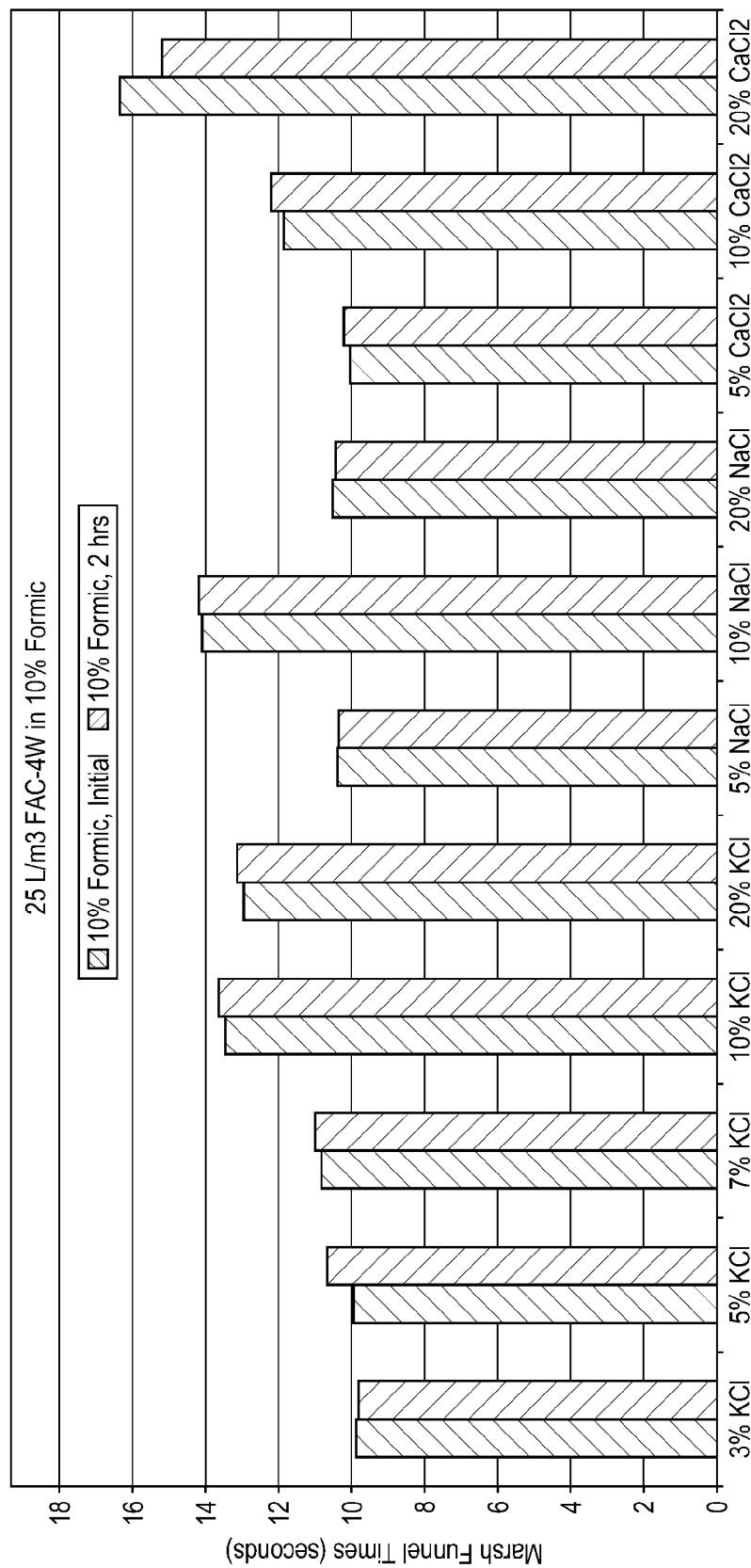
FIG. 4 shows the effect of various salts and salt concentrations on the viscosity of the viscoelastic fluid described herein which contains 10 wt % organic acid and 25 L/m$^3$ surfactant.
Figure 5:
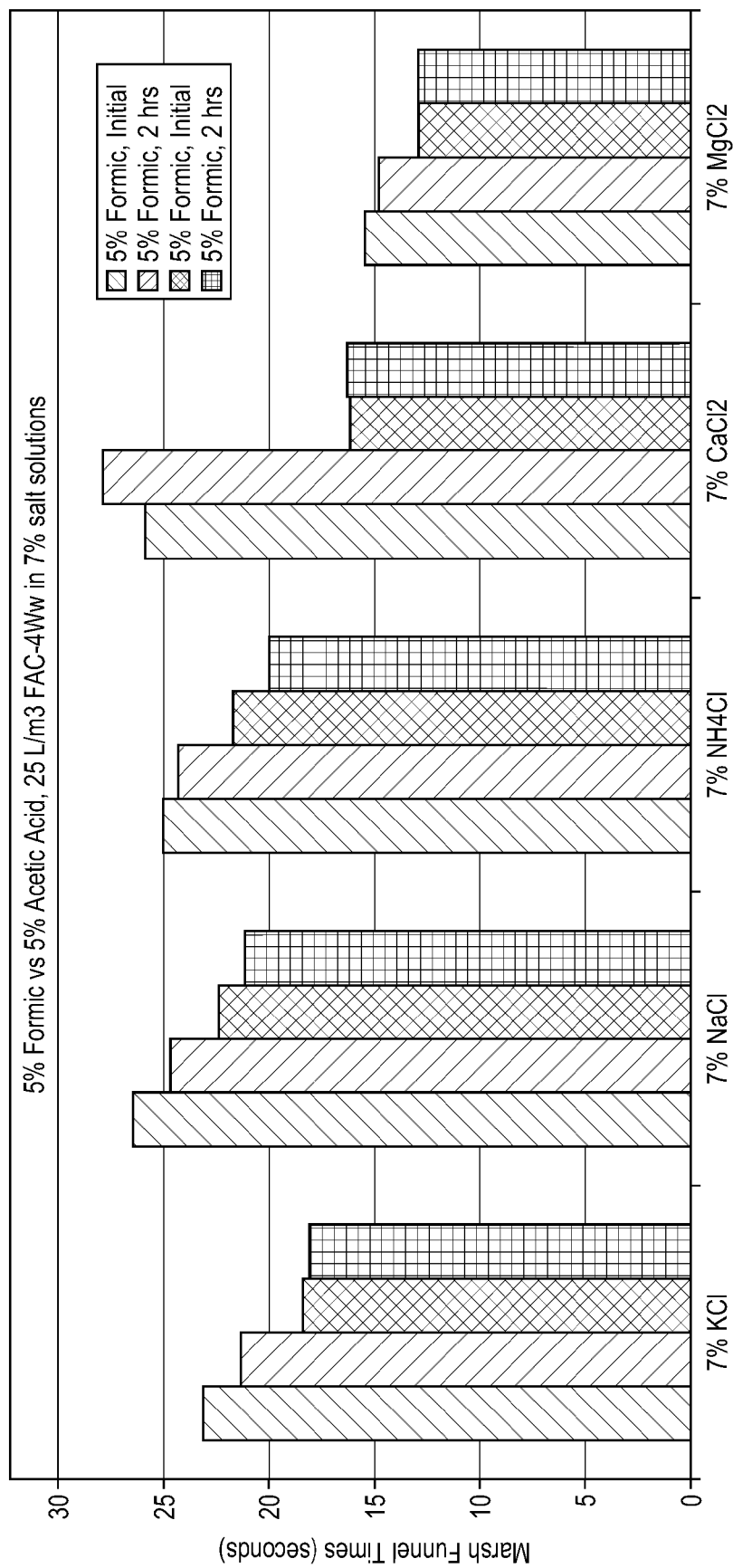
FIG. 5 shows the effect of 5 wt % formic acid vs. 5 wt % acetic acid on the viscosity of the viscoelastic fluid described herein which contains 7 wt % inorganic salt and 25 L/m$^3$ surfactant.

Formic or acetic acid and a monovalent salt were added to a tank of water until the tank contained between 5 to 10 wt % of acid and between 3 to 10 wt % of inorganic salt. The resulting fluid was put into the blender jar and the FAC-4Ww was then added while the fluid was being sheared. A modified marsh funnel procedure was then used to measure viscosity of the fluids as follows: the metal insert had been removed from the spout of the Marsh Funnel, approximately 1000 mls of the solution was mixed, 900 ml of the hydrated fluid was then transferred to the marsh funnel. The time for 300 mls of the hydrated fluid to pass thorough the marsh funnel was then recorded. As shown in FIG. 1, an increase in FAC-4Ww from 25 L/m$^3$ to 40 L/m$^3$ showed no significant effect on viscosity in 10% formic acid. However, an increase in viscosity was noted when the amount of formic acid was lowered from 10 wt % to 5 wt %. FIG. 2 shows that increasing the concentration of FAC-4Ww from 15 L/m$^3$ to 25 L/m$^3$ significantly increased the viscosity of the fluid in 5 wt % formic acid. FIG. 3 shows the effect of salt concentration for various salts on a blend of 5 wt % formic acid and 25 L/m$^3$ FAC-4Ww with optimum viscosity being generally seen to be reached when mixed with 7-10 wt % salt. FIG. 4 shows the effect of salt concentration on a blend of 10 wt % formic acid and 25 L/m$^3$ FAC-4Ww with optimum viscosity being reached when FAC-4Ww was mixed with 10 wt % inorganic salt or more. FIG. 5 compares formic acid with acetic acid in 7% salt solutions. In all cases the formic acid gave longer marsh funnel times especially with 7% calcium chloride.

Example 14

Figure 6:
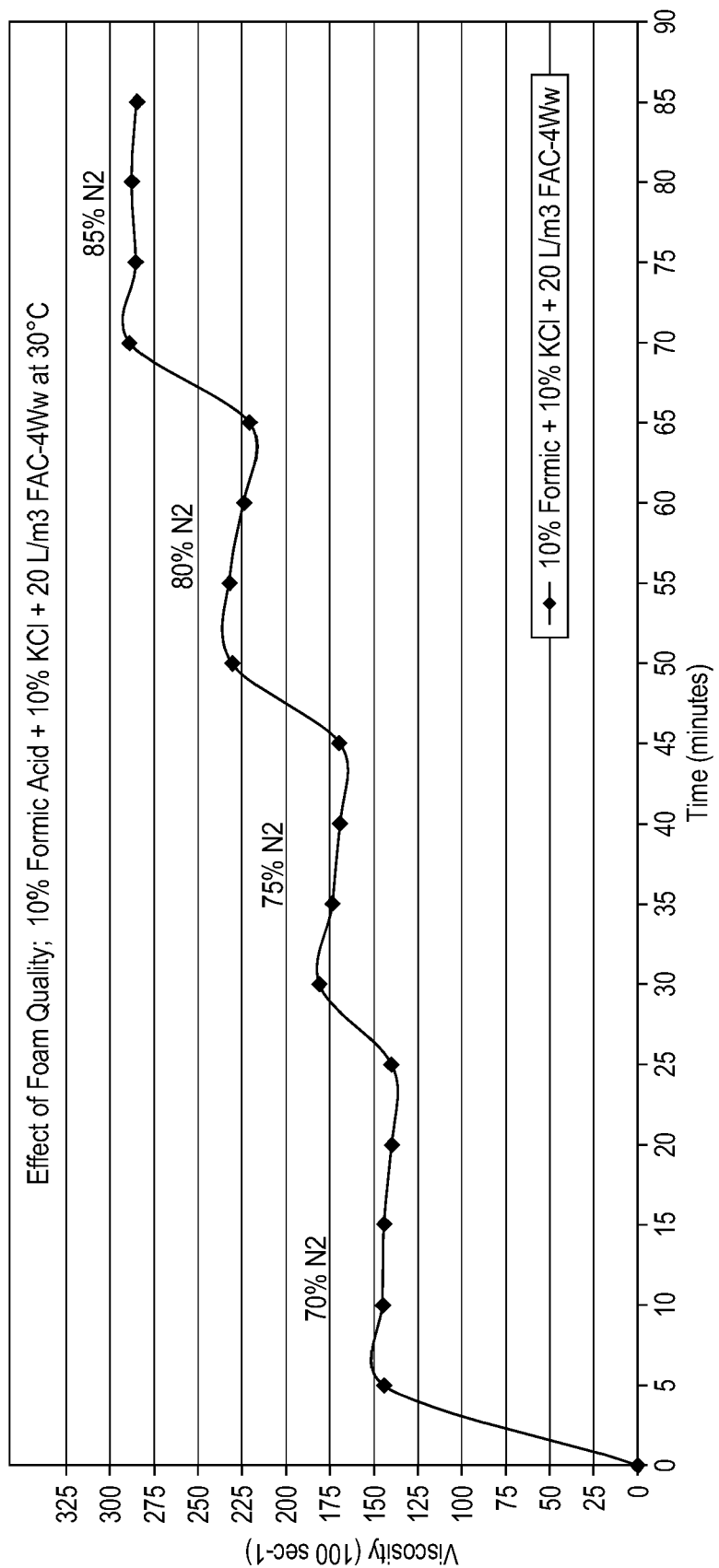
FIG. 6 shows the effect of nitrogen quality on the viscosity of the foamed or emulsified viscoelastic fluid described herein which contains 10 wt % inorganic salt and 10 wt % organic acid.
Figure 7:
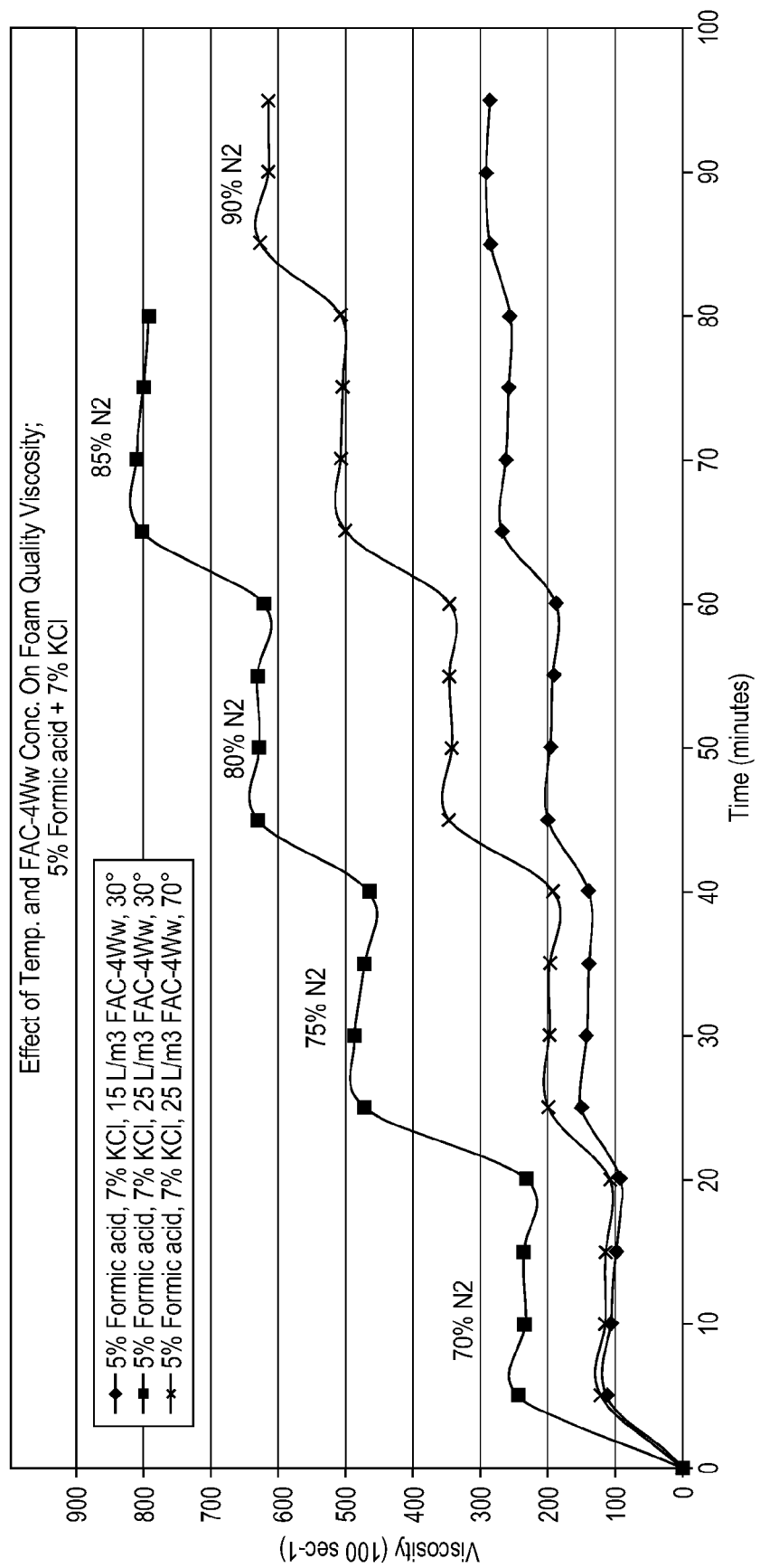
FIG. 7 demonstrates the effect of temperature and concentration of surfactant on the viscosity of varying foam qualities of the viscoelastic fluid described herein having 5 wt % organic acid and wt 7 wt % inorganic salt.
Figure 8:
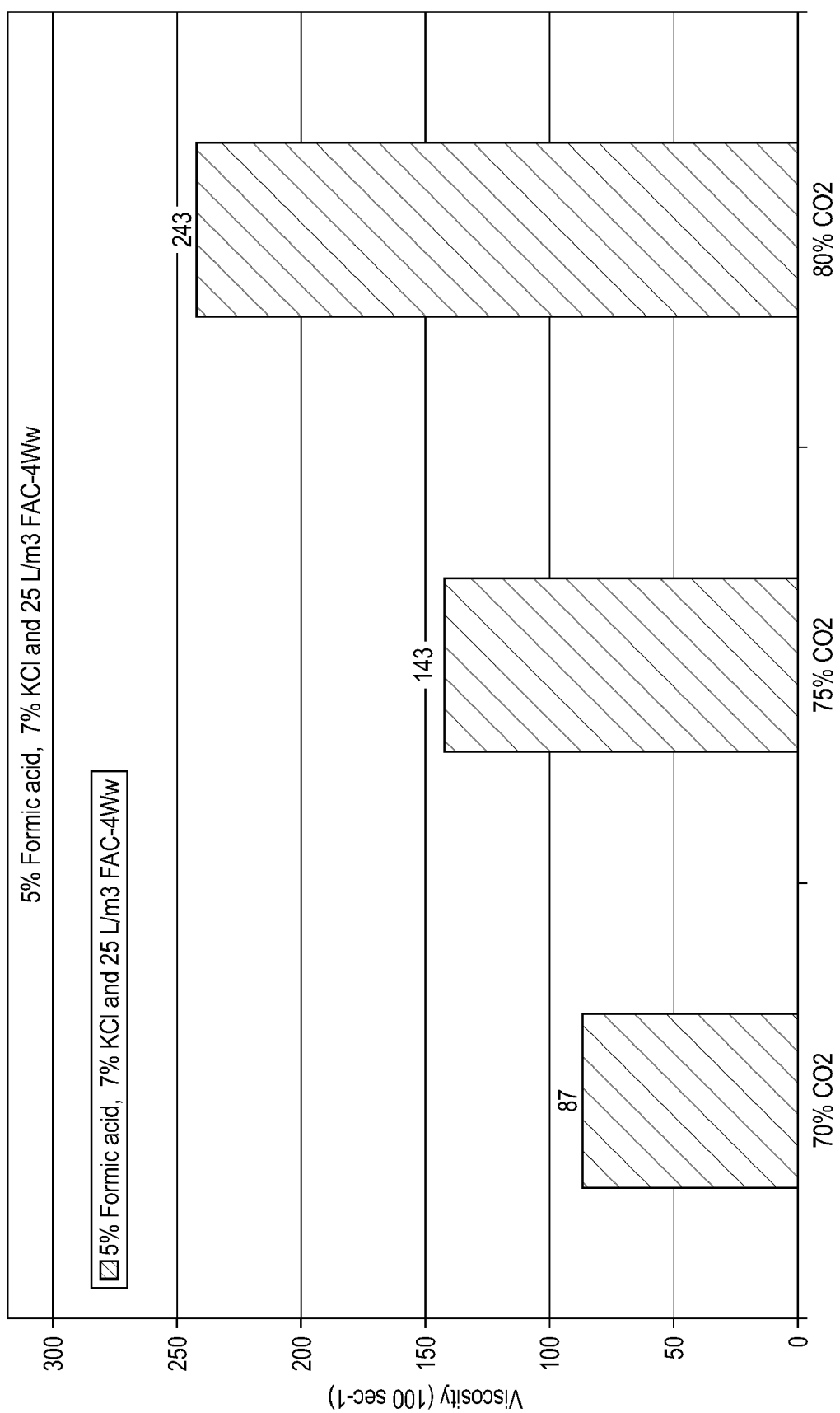
FIG. 8 shows the effect of increased liquid carbon dioxide levels on the viscosity of the emulsified viscoelastic fluid described herein having 5 wt % organic acid, 7 wt % inorganic salt and 25 L/m$^3$ surfactant.

Formic acid and potassium chloride were added to a tank of water until the tank contained between 5 to 10 wt % of acid and between 7 to 10 wt % of salt. FAC-4Ww was then added to the tank. The fluid was then foamed or emulsified using either 70-90% nitrogen or 70-85% carbon dioxide. The rheology of the fluid was then evaluated using a flow-loop rheometer which was equipped with a constant volume circulating pump and an independent air driven pump. The flow-loop was further fitted with a 10,000 psi site glass for observation. In order to get a 70 quality foam 94 mls of fluid were loaded into the flow-loop which had a 312 ml capacity. The balance was then filled with 70 vol. % $N_2$ gas or 70 vol. % liquid $CO_2$. After the $N_2$ or $CO_2$ was added, the fluid in the circulation loop was foamed/emulsified by shearing it with the aid of the nozzle and the temperature increased with the heating jacket on the loop. The pressure was 1000 psi to more closely simulate well conditions. The viscosity measurements were carried out at a nominal shear rate of 100 s$^{-1}$. FIG. 6 shows that increasing the nitrogen quality from 70 to 85% increased the viscosity from approximately 150 cp to approximately 285 cp at 30° C. using 10 wt % formic and 10 wt % KCl and 20 L/m$^3$ FAC-4Ww. FIG. 7 demonstrates the effect of temperature and FAC-4Ww concentration on viscosity at different foam qualities in 5 wt % formic and 7 wt % KCl. In particular, FIG. 7 demonstrates an increase in viscosity when the FAC-4Ww concentration increases and a decrease in viscosity when temperature increases for a given foam quality. FIG. 8 shows that increasing the amount of carbon dioxide increases the viscosity of the emulsion at 30° C. using 5 wt % formic and 7 wt % KCl and 25 L/m$^3$ FAC-4Ww.

From the foregoing, it will be observed that numerous variations and modifications may be effected without departing from the true spirit and scope of the novel concepts of the invention.

What is claimed is:

1. A viscoelastic fluid for enhancing the productivity of a hydrocarbon-bearing formation comprising:
   (a) an organic acid selected from the group consisting of formic acid and acetic acid and mixtures thereof;
   (b) a monovalent salt;
   (c) a $C_{10}$ to $C_{24}$ alkyl trialkyl quaternary ammonium aromatic salt; and
   (d) water.

2. The viscoelastic fluid of claim 1, wherein the monovalent salt is selected from the group consisting of potassium chloride, ammonium chloride, sodium chloride and mixtures thereof.

3. The viscoelastic fluid of claim 1, further comprising a gas or gaseous liquid.

4. The viscoelastic fluid of claim 1, comprising between from about 5 to about 10 weight percent of the organic acid and between from about 3 to about 10 weight percent of the monovalent salt.

5. The viscoelastic fluid of claim 1, wherein the $C_{10}$ to $C_{24}$ alkyl trialkyl quaternary ammonium aromatic salt is a $C_{10}$ to $C_{24}$ alkyl trialkyl quaternary ammonium salicylate or phthalate.

6. The viscoelastic fluid of claim 5, wherein the $C_{10}$ to $C_{24}$ alkyl trialkyl quaternary ammonium salt is a $C_{10}$ to $C_{24}$ alkyl trialkyl quaternary ammonium salicylate.

7. The viscoelastic fluid of claim 6, wherein the $C_{10}$ to $C_{24}$ alkyl trialkyl quaternary ammonium salt is a $C_{18}$ trimethyl quaternary ammonium salicylate.

8. The viscoelastic fluid of claim 6, wherein the organic acid is formic acid.

9. The viscoelastic fluid of claim 8, wherein the monovalent salt is a potassium, ammonium or sodium salt.

10. The viscoelastic fluid of claim 1, further comprising a proppant.

11. A method for enhancing the productivity of a hydrocarbon-bearing formation penetrated by a well which comprises pumping into the well the viscoelastic fluid of claim 1.

12. The method of claim 11, wherein the well is a coal bed methane well.

13. The method of claim 11, wherein the hydrocarbon-bearing formation is subjected to hydraulic fracturing by introducing the viscoelastic fluid into the formation.

14. The method of claim 13, wherein the well is a coal bed methane well.

15. The method of claim 11, wherein the hydrocarbon-bearing formation is subjected to matrix acidizing.

16. The method of claim 11, wherein the hydrocarbon-bearing formation is coal, shale, limestone, dolomite, siltstone or diatomite.

17. The method of claim 16, wherein the hydrocarbon-bearing formation is coal or shale.

18. A foamed or energized viscoelastic fluid for enhancing the productivity of a hydrocarbon-bearing formation comprising:
   (a) an organic acid selected from the group consisting of formic acid and acetic acid and mixtures thereof;
   (b) a monovalent salt;
   (c) a $C_{10}$ to $C_{24}$ alkyl trialkyl quaternary ammonium aromatic salt;
   (d) nitrogen or carbon dioxide; and
   (e) water
wherein the internal phase of the foamed or energized viscoelastic fluid is between from about 63 to 95 percent for foamed fluids or less than 63 percent for energized fluids.

19. The foamed or energized viscoelastic fluid of claim 18, wherein the monovalent salt is selected from the group consisting of potassium chloride, ammonium chloride, sodium chloride and mixtures thereof.

20. The foamed or energized viscoelastic fluid of claim 18, comprising between from about 5 to about 10 weight percent of the organic acid and between from about 3 to about 10 weight percent of the monovalent salt.

* * * * *